(12) United States Patent
Brexel et al.

(10) Patent No.: US 7,020,646 B2
(45) Date of Patent: Mar. 28, 2006

(54) INTERACTIVE PERSONAL DIRECTORY

(76) Inventors: Catherine Brexel, 19-21 route des Gardes, F-92190 Meudon (FR); Nathalie Vivensang, 17-19 rue d'Estienne d'Orves, F-92250 La Garenne-Colombes (FR)

( * ) Notice: Subject to any disclaimer, the term of this patent is extended or adjusted under 35 U.S.C. 154(b) by 17 days.

(21) Appl. No.: 10/422,469

(22) Filed: Apr. 24, 2003

(65) Prior Publication Data

US 2003/0187880 A1    Oct. 2, 2003

Related U.S. Application Data

(63) Continuation of application No. PCT/FR01/03326, filed on Oct. 26, 2001.

(30) Foreign Application Priority Data

Oct. 27, 2000    (FR) .................................. 00 13856

(51) Int. Cl.
*G06F 17/30* (2006.01)
(52) U.S. Cl. .................. 707/1; 707/8; 707/10
(58) Field of Classification Search ............. 707/1–10, 707/100–104.1, 515, 522; 715/501.1; 709/202; 345/853
See application file for complete search history.

(56) References Cited

U.S. PATENT DOCUMENTS 6,199,082 B1 * 3/2001 Ferrel et al. ................. 715/522
6,516,337 B1 * 2/2003 Tripp et al. .................. 709/202

FOREIGN PATENT DOCUMENTS

| EP | 1 030 247 A2 | 8/2000 |
| WO | WO 00/55741 | 9/2000 |

OTHER PUBLICATIONS

Keller, Richard M. et al., *A Bookmarking Service For Organizing and Sharing URLS*, Computer Networks and ISDN Systems, vol. 29, No. 8-13, (Jan. 9, 1997), pp. 1103-1114.

* cited by examiner

*Primary Examiner*—Charles Rones
*Assistant Examiner*—Neveen Abel-Jalil
(74) *Attorney, Agent, or Firm*—DLA Piper Rudnick Gray Cary US LLP

(57) ABSTRACT

A process for generating personalized digital directory pages for display with a navigator program including a personalization step including recording in a temporary memory of a client station a digital file corresponding to an HTML page comprising hypertext links for access to other pages and descriptors associated with pictograms and proceeding to a display of the page on the client station, recording in a temporary memory of the client station at least one personalization file comprising a link identifier and at least one personalization descriptor selected by the user, transmitting the content of the temporary memory to the server, and recording in a server memory the personalization file data linked with the user identifier and the link identifier in question.

8 Claims, 2 Drawing Sheets

Figure 2

INTERACTIVE PERSONAL DIRECTORY

RELATED APPLICATION

This is a continuation of International Application No. PCT/FR01/03326, with an international filing date of Oct. 26, 2001, which is based on French Patent Application No. 00/13856, filed Oct. 27, 2000.

FIELD OF THE INVENTION

This invention pertains to an interactive personal directory constituted in the form of digital pages transmitted by a server to a client station connected to the Internet or to a telecommunications network.

BACKGROUND

Known in the state of the art are various patents pertaining to processes for generating directory pages.

As an example, WO 00/55741 pertains to a system and management and link classification process (also called URL, or Uniform Resource Locator) which enables creation of public and personal repertoires of these links with the goal of improving Internet navigability. In various forms of implementation, that system stores Web links for multiple users in a database and provides processes for the extraction and posting of these Web links, processes for searching for Web links that are linked to existing links that a user stored in the system, as well as other associated characteristics. The users can organize and manage the link collections and search for related links in the link collections of other users. The characteristic criteria for database correspondence can use other information to search for relationships such as the user profile information comprising, e.g., age, sex and type of professional activity.

The article "A bookmarking service for organizing and sharing URLs" published in "Computer Networks and ISDN Systems", North Holland Publishing, Amsterdam, Vol. 29, No. 8–13 of Sep. 1, 1997, describes another solution for constituting a collection of links and personalizing this collection.

It would therefore be advantageous to enable each user connected to a page server via a network of the Internet or intranet type to personalize a directory in an interactive manner by associating personal descriptors with the proposed sites.

SUMMARY OF THE INVENTION

This invention relates to a process for generating personalized digital directory pages for display with a navigator program including a personalization step including recording in a temporary memory of a client station a digital file corresponding to an HTML page including hypertext links for access to other pages and descriptors associated with pictograms and proceeding to a display of the page on the client station, recording in a temporary memory of the client station at least one personalization file including a link identifier and at least one personalization descriptor selected by the user, transmitting the content of the temporary memory to the server, and recording in a server memory the personalization file data linked with the user identifier and the link identifier in question.

BRIEF DESCRIPTION OF THE DRAWINGS

Better comprehension of the invention will be obtained from the description below of a nonlimitative example of implementation with reference to the attached drawings in which:

FIG. 2 represents a view of the display generated by the process according to the invention.

DETAILED DESCRIPTION

Figure 1:
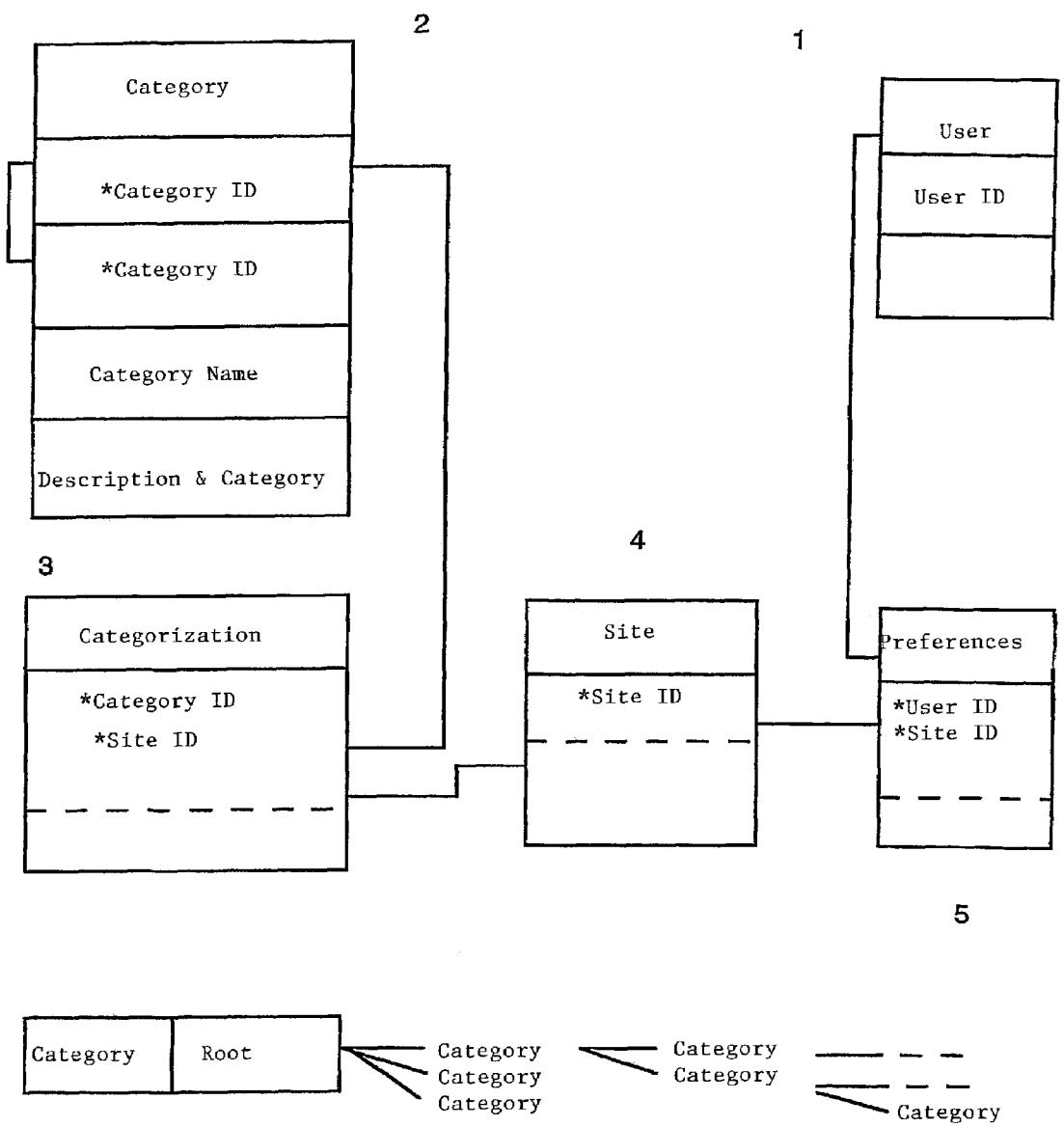
FIG. 1 schematically represents the architecture of the server.

The invention provides greater comfort and freedom for the internaut by allowing management of successive navigations and to modify and enrich the content of the lists that are offered.

For this purpose, the invention pertains in its broadest sense to a process for generating personalized digital directory pages intended to be displayed with a navigator type program, comprises a personalization step:
  recording in a temporary memory of a client station a digital file corresponding to an HTML page comprising hypertext links for access to other pages as well as descriptors associated with pictograms and proceeding to the display of the page on the client station,
  recording in a temporary memory of the client station at least one personalization file comprising a link identifier and at least one personalization descriptor selected by the user,
  transmitting the content of the temporary memory to the server, and
  recording in the server memory the personalization file data linked with the user identifier and the link identifier in question.

According to a preferred mode of implementation, there is recorded in a server memory a first database of users comprising for each user a unique identifier and at least one associated user descriptor, a second database of sites comprising for each site a unique identifier and an address, a third table of site categories comprising for each category a unique identifier and a multiplicity of site identifiers, and a fourth database of descriptors comprising a unique identifier for each descriptor and a multiplicity of site identifiers and user identifiers, with a request stemming from a client station comprising a category identifier and the user identifier, and causing generation of a file comprising the site identifiers associated with the category identifier transmitted by the client station, and for each of the site identifiers the category identifier corresponding to the site identifier and the user identifier in question.

The selection of the descriptor by the user is advantageously performed by the designation of one of the pictograms displayed on the directory page, the recording of the identity of the displayed pictogram descriptor, by the designation of the site and the transmission by the client station to the server of a digital file comprising pairs formed by at least one category descriptor and a site identifier.

According to another aspect, the page display means comprise a filter enabling selection of the identifiers of the sites to be displayed as a function of the associated personal descriptor value.

According to yet another aspect, the process comprises a step of selecting sites to be deleted including selecting a deletion pictogram, selecting one or more site identifiers, and assigning a predefined value to the descriptor corresponding to each of the selected sites, then transmitting this information to the server for the recording in the descriptor database of the value in relation with the sites to be deleted.

These sites are in fact only deleted from the displayed list. They can be reactivated by a subsequent operation.

The process advantageously comprises a step for the addition of sites to a category including selecting a site identifier and assigning to it a value corresponding to an existing category, then transmitting said information to the server and recording in the category database the identifier of the selected site.

This operation can be performed by an action on a "copy" pictogram associated with a link to an application performing the operations in question and designating the destination (category). It also enables adding a site which is not in the database and adding it to a category by means of a form to be filled out.

According to another aspect, the process comprises recording on the server new categories of sites specific to a user or to a user community.

Turning now to FIG. 1, the server comprises a set of tables:
- a table (1) of "users" in which are recorded for each user a unique identifier $ID_{ut}$ as well as the user's personal data;
- a table (2) of "categories" in which are recorded for each category or family of sites a unique identifier $ID_{cat}$ as well as a text or graphical designation of the category, a description and optionally a unique identifier $ID_{cm}$ corresponding to a class of categories that groups together multiple categories;
- a table (3) containing the identifiers of categories and sites belonging to that category;
- a table (4) of "sites" containing unique identifiers of sites $ID_{site}$ and the IP address of the site as well as optionally a descriptor of the site;
- a table (5) of "preferences" in which are recorded for each user and each site a preference indicator.

Figure 2:
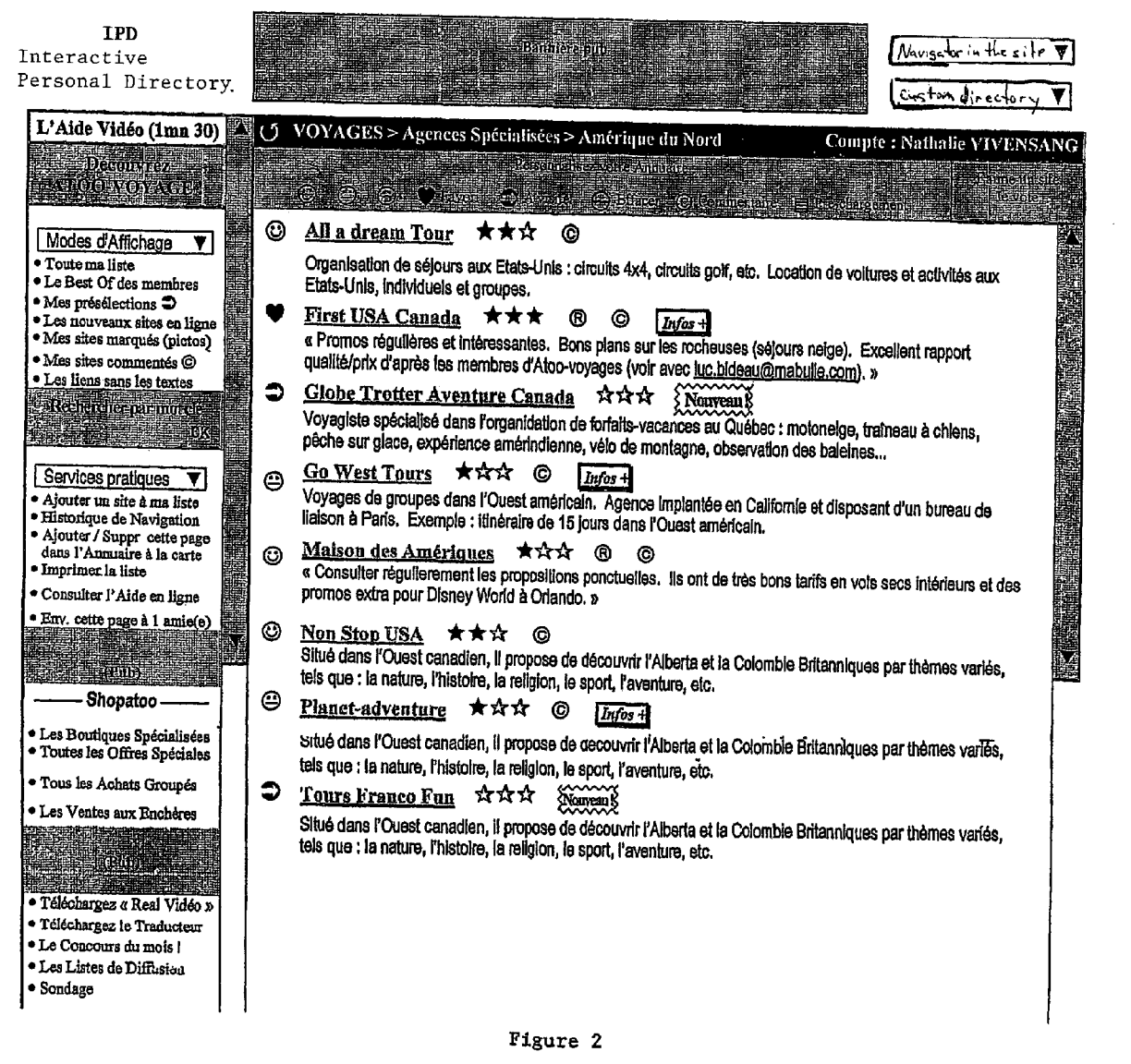

The preference indicator is modified by the user from a client station. The internaut selects a category of sites by sending a request constructed by the selection of a hypertext link displayed on the computer screen and the recording of an identifier associated with this hypertext link, and transmitting it to the server in the form of a digital file containing the selected category identifier as well as a user identifier. In return, the server sends a file containing the information associated with the category identifier and the list of sites associated with this category identifier as well as the preference indicators if such exist. This file is used by a navigator to produce a screen such as is represented in FIG. 2.

The user has available a collection of pictograms that can be selected for annotating a site appearing on the list. The pictogram "to visit" enables preselecting sites that the internaut wants to visit subsequently.

The pictogram "remove" allows removal of a pictogram appearing in relation with a listed site by superposition with the existing pictogram. The pictogram "preloading" enables the command to preload the site. It is associated with a computer procedure commanding the appearance of a clickable icon for opening a window with the HTML page loaded in cache memory. The computer procedure moreover causes modification of the appearance of the pictogram as a function of the preloading status (in the process of loading in the cache memory, preloaded and immediately displayable, or already displayed during the session).

The "smileys" pictograms allow annotation regarding the interest level of a site.

The "comment" pictogram enables recording of a comment related to a site. This function also allows replacement of the summary proposed by the "site" table with a personal comment recorded in the "preferences" table.

The sites bearing comments are presented in relation with a clickable pictogram enabling display alternatively of the personal comment or the public summary. Recording the personal comment can optionally be supplemented by the recording of information for the display solely of the personal comment or of the personal comment accompanied by the public summary, or of a clickable icon enabling switching back and forth between the two types of comments.

The "vote" pictogram allows associating with the site an indicator common to multiple users, making it appear in the "best of" or the preferred sites of an internaut community.

The display also has additional functions such as:
- a list of short cuts enabling direct access to preferred pages,
- a history storing in memory and displaying the list of recently visited sites,
- an add function for adding sites from other lists. This function can include adding a site created by the internaut.

Another function is the personalized management of favorite sites. This function includes recording in a table the identifiers of sites preselected by the user, and of creating in the welcome page a list of the preselected sites to enable rapid access to these sites by a hypertext link. Favorite sites are designated by the attribution of a pictogram which, in addition to adding a visible mark in the margins of the designated sites, also automatically integrates them in the list of favorite sites.

Another function includes recording in a category table a personal category in which the user can register selected or created sites constituting a directory corresponding to these personal interest centers.

Another function includes assigning to selected sites a "to visit" icon enabling filtering the display of the directory page so as to optionally display only the sites bearing this indicator in the corresponding table associated with the user.

The HTML page optionally comprises a library of unassigned pictograms enabling modification of the graphical form of the standard pictograms or the creation of additional functions. This library can be displayed in an additional window or in part of the principal window.

The invention is described above as a nonlimitative example.

The invention claimed is:

1. A process for generating personalized digital directory pages for display with a navigator program including a personalization step comprising:
   recording in a temporary memory of a client station a digital file corresponding to an HTML page comprising hypertext links for access to other pages and descriptors,
   proceeding to a display of the page on the client station,
   recording in a temporary memory of the client station at least one personalization file comprising a link identifier and at least one personalization descriptor selected by the user of the client station,
   transmitting the content of the temporary memory to the server, and
   recording in a server memory the personalization file data linked with the user identifier and the link identifier, a first database of users comprising for each user a unique identifier and at least one associated user descriptor, a second database of sites comprising for each site a unique identifier and an address, a third database of site categories comprising for each category a unique identifier and a multiplicity of site identifiers, and a fourth database of descriptors comprising a unique identifier for each descriptor and a multiplicity of site identifiers and user identifiers, with a request from the client station comprising a category identifier and the user identifier, and causing the generation of a file comprising the site identifiers associated with the category identifier transmitted by the client station, and for each of said site identifiers the category identifier corresponding to the site identifier and the user identifier.

2. The process according to claim 1, wherein selection of the descriptor by the user is performed by designating one of the descriptors displayed on the directory page, recording the identity of the displayed descriptor, by designating the site and the transmission by the client station to the server of a digital file comprising pairs formed by at least one category descriptor and a site identifier.

3. The process according to claim 1, wherein the display comprises a filter enabling selection of the identifiers of the sites to be displayed as a function of associated personal descriptor value.

4. The process according to claim 1, further comprising selecting sites to be deleted comprising selecting a deletion descriptor, selecting one or more site identifiers, assigning a predefined value to a descriptor corresponding to each of the selected sites, and transmitting information to the server for recording in the descriptor database of the value in relation with the sites to be deleted.

5. The process according to claim 1, further comprising adding sites to a category including selecting a site identifier and assigning a value corresponding to an existing category, and transmitting the information to the server and recording in the category database the identifier of the selected site.

6. The process according to claim 1, further comprising adding an additional category.

7. The process according to claim 1, further comprising recording personal comments and displaying an icon linked to sites bearing a personal comment, the icon being associated with a link for switching between the display of the personal conmient or the public summary.

8. The process according to claim 1, further comprising recording a preloading indicator enabling command of the preloading of the associated site, and displaying commanding the appearance of a clickable icon for opening a window with the HTML page loaded in cache memory and causing modification of the appearance of the descriptor as a function of the preloading status in the process of loading in the cache memory, preloaded and immediately displayable, or already displayed during the session.

* * * * *